C. E. BALLOU.
INSULATED RAIL JOINT.
APPLICATION FILED AUG. 11, 1916.
1,227,028.
Patented May 22, 1917.
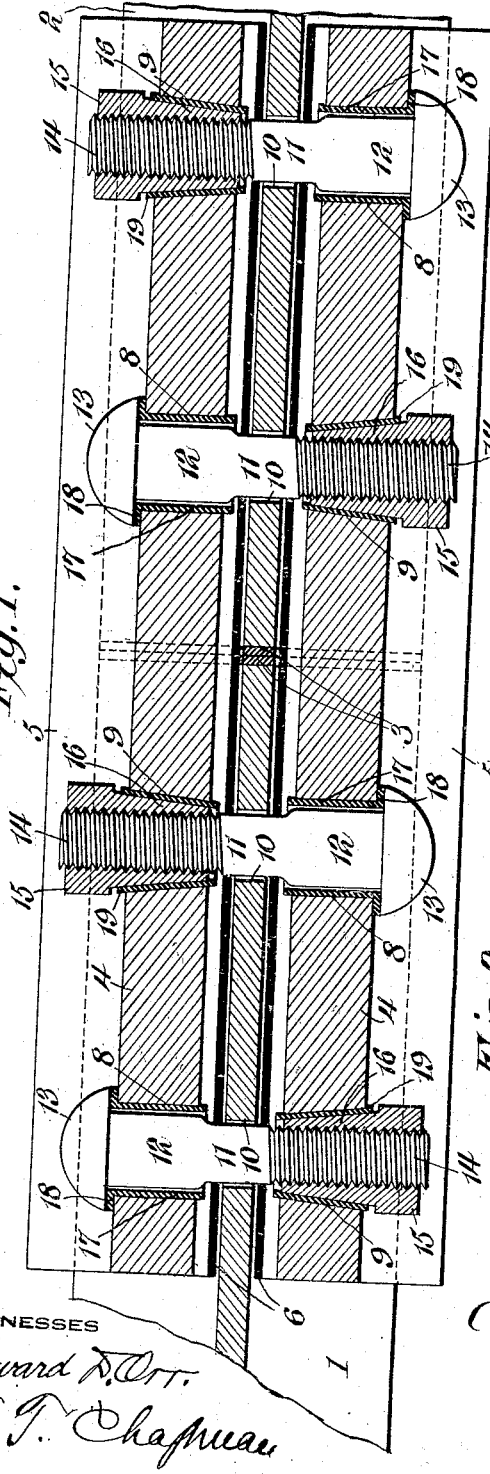
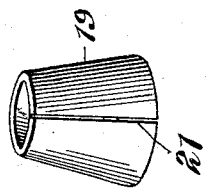
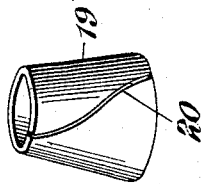
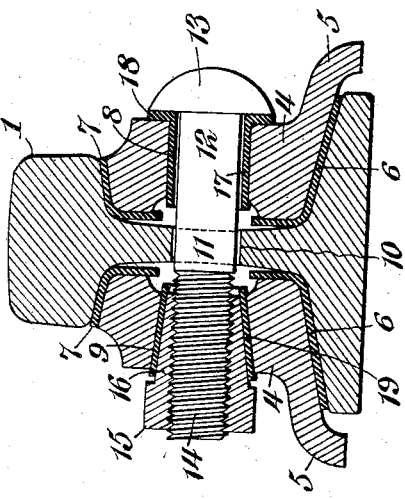
WITNESSES
C. E. Ballou, INVENTOR,
BY
ATTORNEYS

UNITED STATES PATENT OFFICE.

CHARLES E. BALLOU, OF ROANOKE, VIRGINIA.

INSULATED RAIL-JOINT.

1,227,028.

Specification of Letters Patent.  Patented May 22, 1917.

Application filed August 11, 1916. Serial No. 114,429.

*To all whom it may concern:*

Be it known that I, CHARLES E. BALLOU, a citizen of the United States, residing at Roanoke, in the county of Roanoke and State of Virginia, have invented certain new and useful Improvements in Insulated Rail-Joints, of which the following is a specification.

This invention has reference to rail joints, and particularly when used in connection with rails carrying electric currents, and its object is to provide a joint which shall not only effectively connect the meeting ends of two rails, but which will effectively insulate the rails without liability of the breaking down of the insulation due to wear incident to traffic.

In accordance with the present invention fish plates are employed to connect the meeting ends of two rails, but these fish plates are made of greater thickness than is customary, while the bolts employed are of peculiar construction in that the nuts have long-taper shanks, and the bolts are insulated from the fish plates and the fish plates themselves are insulated from the rails, the whole arrangement being such that the insulation is not at all subjected to wear due to traffic conditions, and, therefore, lasts indefinitely.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings :—

Figure 1 is a longitudinal horizontal section of a rail joint embodying the present invention.

Fig. 2 is a cross-section of the rail joint through one of the bolts.

Figs. 3 and 4 are perspective views of different forms of insulating sleeves for the bolt nuts.

Referring to the drawings there are shown the meeting ends of two rails, 1, 2, respectively, these rails being of the ordinary type employed in railroads. The meeting ends of the rails are separated by sheets 3 of insulating material, so that the rails may not come into electrical contact at the ends. There are also provided fish plates 4, these fish plates being alike and are applied on opposite sides of the meeting ends of the rails in accordance with the usual practice.

Each fish plate is of a length corresponding to ordinary fish plates and is of a height, considering the fish plate as installed, somewhat less than the distance between the top faces of the rail flanges and the under face of the tread portion of the rail. Each fish plate is of greater thickness than usual and has the lower edge provided with an outstanding flange 5 to overhang the rail flange. Interposed between each fish plate and the corresponding flange of the rail is a sheet 6 of insulating material not only extending along the bottom face of the fish plate, but along the web of the rail for an appropriate distance. Interposed between each fish plate and the under face of the corresponding portion of the tread of the rail is a sheet 7 of insulating material of sufficient width to also interpose between the web of the rail and the portion of the fish plate immediately adjacent thereto.

Each fish plate is traversed by passages 8 of elliptical form and other passages 9 of conical form, the passages alternating and when the fish plates are in the installed position an elliptical passage 8 of one fish plate registers with a conical passage 9 of the other fish plate, while the web portion of each rail has passages 10 therethrough, as is customary, such passages registering with the passages 8 and 9.

There are also provided bolts 11 each with an elliptical shank portion 12 long enough to traverse the elliptical passages 8, and the body of the bolt 11 at one end terminates in a head 13 and at the other end in a threaded portion 14, the latter being long enough to traverse a conical passage 9 and extend a considerable distance therebeyond. The threaded portion 14 is of a sufficient length to receive a nut 15 having an axially extended shank 16 with a long-taper outer surface, such taper shank portion being usually somewhat longer than the thickness of the fish plate where traversed by the taper shank of the nut. The threads of the nut are carried through the shank, so that when the nut is applied to the threaded end 14 of the bolt it is engaged therewith throughout the entire length of the nut and its shank.

The elliptical portion 12 of the bolt is separated from the respective fish plate 4 by a sleeve 17 of insulating material having an end flange 18 interposed between the head 13 and the corresponding face of the fish plate. Interposed between the shank 16 of each nut 15 and the walls of the taper hole 9 is a taper sleeve 19 of insulating material. This taper sleeve may be circumferentially continuous, or, as shown in Fig. 3, may have an inclined slit 20 or a straight slit 21, as shown in Fig. 4, thus permitting the sleeve to contract to some extent under exterior pressure. When the joint is assembled, the insulation 3 is introduced between the extremities of the meeting ends of the rails, so as to insulate them at such point, the sheets 6 and 7 of insulating material are interposed between the fish plates and the rails and the bolts 11 are applied with the insulating sleeves 17 about the elliptical portions 12.

The nuts 15 are then applied with the insulation 19 on the shanks 16 of the nuts and traversing the passages 9 in the corresponding fish plates 4.

The added thickness of the fish plates gives them materially increased strength and the joint is correspondingly strengthened. The track bolt is with the exception of the nut of common construction, except that the elliptical portion 12 is somewhat elongated, while the threader portion of the bolt is also somewhat elongated, so as to receive the nut with the elongated taper shank. The threaded end of the bolt extends nearly to the web of the rail, while the elongated nut not only keeps the joint tight, but holds the insulating material in place. The conical insulating sleeves 19 are somewhat longer than the thickness of the fish plates where traversed by them, and are of sufficient length to extend beyond the small end of the shank 16, say, for one-eighth of an inch, more or less. The conical insulation 19 is a one piece structure, although as shown in Figs. 3 and 4 it may be opened along one side in inclined or spiral form, as in Fig. 3, or straight lengthwise of the sleeve, as shown in Fig. 4.

The conical shank 16 is long enough so that the nut 15 is always spaced a quarter of an inch, more or less, from the fish plate, hence there may be no contact or engagement with the fish plate. In applying the conical insulation, it is placed upon the conical surface of the nut shank and the nut is then screwed upon the bolt. The long taper of the shank insures the permanency of connection between the nut and bolt even under most severe traffic conditions, this having been proven by long experience under actual traffic conditions, and will resist all vibrations of traffic without running loose. The conical insulating sleeve cannot work through the fish plate toward the rail, because of its conical form, while the nut 15 prevents the movement of the sleeve outwardly to any material extent, wherefore the sleeve remains tight in place at all times and there is practically no frictional wear. Experience has demonstrated that even under the most severe traffic conditions the nuts and insulation remain tight, except when the nuts are purposely loosened by means of a wrench.

What is claimed is:—

1. An insulated rail joint, comprising fish plates having bolt passages therethrough, certain of the passages being of taper form, nuts for the bolts having axially extended taper shanks adapted to the taper passages through the fish plates, insulation between the fish plates and the rails, insulation between the head ends of the bolts and the corresponding fish plates, and conical insulating sleeves between the conical shanks of the nuts and the corresponding fish plates.

2. An insulated rail joint, comprising fish plates having bolt passages therethrough, certain of the passages being of taper form, nuts for the bolts having axially extended taper shanks adapted to the taper passages through the fish plates, insulation between the fish plates and the rails, insulation between the head ends of the bolts and the corresponding fish plates, and conical insulating sleeves between the conical shanks of the nuts and the corresponding fish plates, the conical sleeves being of greater length than the thickness of the fish plates where traversed by them.

3. An insulated rail joint, comprising fish plates having bolt passages therethrough, certain of the passages being of taper form, nuts for the bolts having axially extended taper shanks adapted to the taper passages through the fish plates, insulation between the fish plates and the rails, insulation between the head ends of the bolts and the corresponding fish plates, and conical insulating sleeves between the conical shanks of the nuts and the corresponding fish plates, the conical sleeves being of greater length than the thickness of the fish plates where traversed by them, and said conical sleeves being of one piece construction each with a longitudinal slit to permit contraction of the sleeve.

4. An insulated rail joint provided with fish plates insulated from the rail, and bolts traversing the fish plates and insulated therefrom, each bolt having a nut with an axially extended long-taper shank and the fish plate where traversed by the nut being correspondingly tapered and the insulation between the bolt and fish plate where traversed by the taper nut being interposed between the outer taper face of the nut shank and the inner taper face of the passage traversed by the insulation, the insulation between the taper shank and the passage through which it extends being of conical form and of a length to project beyond both ends of the passage in which it is lodged.

5. An insulated rail joint, comprising fish plates each having alternating elliptical and conical passages, with the elliptical passage of one fish plate registering with the conical passage of the other fish plate, bolts with elliptical portions adapted to the elliptical passages and threaded portions of a length to extend through and beyond the conical passages, nuts with taper axially extended shanks adapted to the conical passages and of a length to extend through them, and insulation interposed between the fish plates and the rail, between the elliptical portions of the bolts and the passage in the fish plates through which they extend, and between the taper shanks of the nuts and the taper passages in the fish plates.

6. An insulated rail joint for the meeting ends of railway rails, comprising fish plates spanning the meeting ends of the rails and insulated therefrom, and bolts traversing the fish plates and rails and insulated from the fish plates, each bolt having a nut with a taper shank and the fish plates having taper passages for the taper shanks of the nuts, each taper shank being insulated from the corresponding fish plate by a conical sleeve of insulating material of greater length than the thickness of the fish plate where traversed by it.

7. An insulated rail joint for the meeting ends of railway rails, comprising fish plates insulated from the rails, and bolts traversing and insulated from the fish plates, each bolt having a nut with a taper shank traversing a fish plate, with said fish plate provided with a taper passage of greater diameter than the shank of the nut, and a taper sleeve of insulating material interposed between the taper shank of the nut and the walls of the taper passage through the fish plate.

In testimony whereof I have affixed my signature in the presence of two witnesses.

CHARLES E. BALLOU.

Witnesses:
E. A. LAUGHON,
A. L. FEATHER.

Copies of this patent may be obtained for five cents each, by addressing the "Commissioner of Patents, Washington, D. C."